(12) United States Patent
Ouimet

(10) Patent No.: US 7,601,315 B2
(45) Date of Patent: Oct. 13, 2009

(54) PROCESS FOR THE RECOVERY OF CARBON DIOXIDE FROM A GAS STREAM

(75) Inventor: Michel A. Ouimet, Montreal, CA (US)

(73) Assignee: Cansolv Technologies Inc., Montreal, Quebec (CA)

( * ) Notice: Subject to any disclaimer, the term of this patent is extended or adjusted under 35 U.S.C. 154(b) by 165 days.

(21) Appl. No.: 11/616,992

(22) Filed: Dec. 28, 2006

(65) Prior Publication Data

US 2008/0159937 A1   Jul. 3, 2008

(51) Int. Cl.
*B01D 53/62* (2006.01)
(52) U.S. Cl. .................................... 423/228
(58) Field of Classification Search ................ 423/228
See application file for complete search history.

(56) References Cited

U.S. PATENT DOCUMENTS

| | | | |
|---|---|---|---|
| 3,851,041 A * | 11/1974 | Eickmeyer | .............. 423/223 |
| 4,096,085 A * | 6/1978 | Holoman Jr. et al. | ........ 252/189 |
| 4,112,050 A | 9/1978 | Sartori et al. | |
| 4,217,237 A | 8/1980 | Sartori et al. | |
| 4,624,838 A | 11/1986 | Pan et al. | |
| 5,277,885 A | 1/1994 | Peytavy et al. | |
| 5,618,506 A | 4/1997 | Suzuki et al. | |
| 5,700,437 A | 12/1997 | Fuji et al. | |
| 6,036,931 A | 3/2000 | Yoshida et al. | |
| 6,337,059 B1 | 1/2002 | Schubert et al. | |
| 6,500,397 B1 | 12/2002 | Yoshida et al. | |
| 6,579,508 B2 * | 6/2003 | Ishida | .............. 423/220 |
| 6,582,498 B1 | 6/2003 | Sass et al. | |
| 6,755,892 B2 | 6/2004 | Nalette et al. | |

(Continued)

FOREIGN PATENT DOCUMENTS

CA    2528205 A1    12/2004

(Continued)

OTHER PUBLICATIONS

International Search Report received in the corresponding International Application No. PCT/CA2007/002341, issued on Apr. 22, 2008.

(Continued)

*Primary Examiner*—Timothy C Vanoy
(74) *Attorney, Agent, or Firm*—Philip C. Mendes da Costa; Bereskin & Parr LLP

(57) ABSTRACT

A process for removing acid gas from a gas stream utilizes a low viscosity absorbent comprising a solution of at least one selected amine. The absorbent may include (1) at least one polyamine in the absence of an effective amount of tertiary amine functionalities having a pKa sufficient to neutralize carbamic acid, wherein the polyamine has at least one primary amine functionality having a pKa of <10.0 at 25° C. and wherein the feed gas stream has an SO2 concentration less than 5 ppm vol.; or (2) a polyamine in the absence of an effective amount of tertiary amine functionalities having a pKa sufficient to neutralize carbamic acid, wherein the polyamine has at least one secondary amine functionality having a pKa for each sorbing nitrogen of <10.0 at 25° C. The polyamines may include diethylenetriamine (DETA), triethylenetetramine (TETA) and tetraethylenepentamine (TEPA) or mixtures thereof.

18 Claims, 3 Drawing Sheets

U.S. PATENT DOCUMENTS

| | | |
|---|---|---|
| 7,004,997 B2 | 2/2006 | Asprion et al. |
| 7,056,482 B2 | 6/2006 | Hakka et al. |
| 7,419,646 B2 * | 9/2008 | Cadours et al. ............. 423/220 |
| 2001/0021362 A1 * | 9/2001 | Ishida ........................ 423/228 |

FOREIGN PATENT DOCUMENTS

| | | |
|---|---|---|
| CA | 2532549 A1 | 2/2005 |
| CA | 2559081 A1 | 9/2005 |
| GB | 2018615 A * | 10/1979 |
| WO | 02/09849 A2 | 2/2002 |
| WO | 02/13948 A2 | 2/2002 |
| WO | PCT/EP2005/002498 A1 | 3/2005 |
| WO | PCT/JP2005/004473 A1 | 3/2005 |
| WO | PCT/EP2006/002398 A1 | 3/2006 |
| WO | PCT/JP2006/307054 | 3/2006 |
| WO | PTC/JP2006/307054 | 3/2006 |
| WO | PCT/2006/150298 A | 6/2006 |
| WO | PCT/2006/167520 A2 | 6/2006 |

OTHER PUBLICATIONS

Idem et al, Pilot Plant /studies of the CO2 Capture Performance of Aqueous MEA land MEA/MDEA Sovents at the University of Regina CO2 Capture Technology Development Plant and the Boundry Dam CO2 Capture Demonstration Plant, Ind. Eng. Chem. Res. 2006, 45, 2414-2420.

* cited by examiner

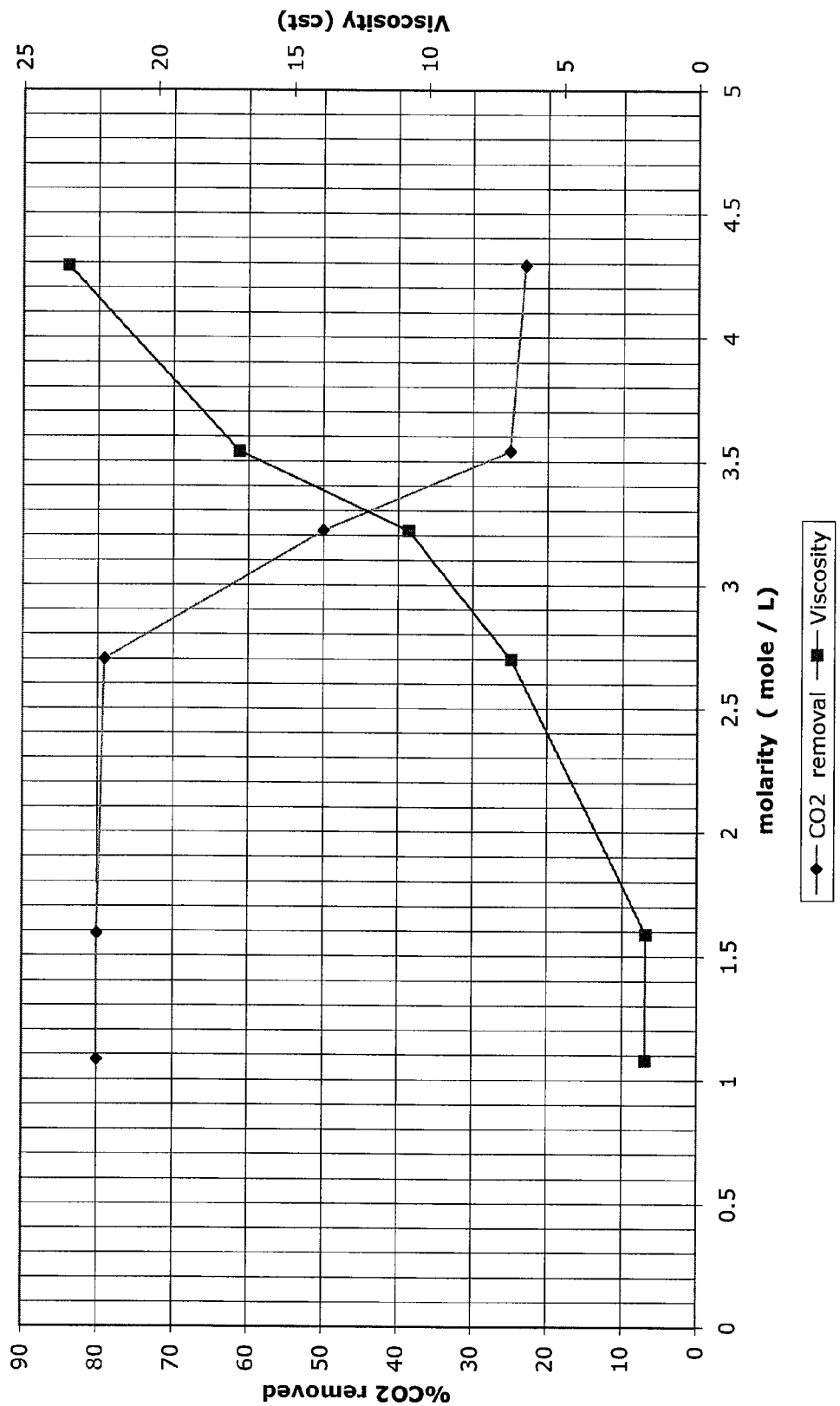

PROCESS FOR THE RECOVERY OF CARBON DIOXIDE FROM A GAS STREAM

FIELD OF THE INVENTION

This invention relates to a process for separating carbon dioxide from gas mixtures and, in particular, from waste gas streams which may contain more than one percent by volume of carbon dioxide.

BACKGROUND OF THE INVENTION

Fossil fuels are typically combusted in industry to produce heat and/or electricity. The combustion results in the production of a stream of flue gas which contains carbon dioxide and other components. In addition, other sources of waste gas streams containing carbon dioxide, which may be produced by industry, include landfill gas, blast furnace gas and off gas from an electric arc bauxite reduction furnace.

Carbon dioxide has been identified as a green house gas. Accordingly, the amount of carbon dioxide emitted with flue gases from an industrial plant are subject to regulation in many jurisdictions. Therefore, waste gas streams, prior to being vented to the atmosphere, typically need to be treated to control the amount of carbon dioxide that is emitted to the atmosphere.

Techniques for separating carbon dioxide from a gas mixture are known. These include the use of regenerable absorbents, cryogenic techniques and membrane techniques. However, each of these technologies is energy intensive when applied to capturing carbon dioxide from a gas mixture. Accordingly, additional energy, which may well be obtained from burning fossil fuels, is required to operate the carbon dioxide capture process. Accordingly, the operating of the carbon dioxide capture process may result in the generation of additional flue gas that must be treated.

Various amine absorbents, which are sometimes referred to as solvents, are well known for use in removing carbon dioxide from flue gas. Factors which influence the economics of a carbon dioxide capture process utilizing amine-base solvents include the liquid to gas ratio (L/G), the regeneration steam requirement and the amine loss rate. The liquid to gas ratio is a ratio of the liquid flow rate (i.e. the flow rate of the absorbent through, e.g., an absorption column) to the gas flow rate (e.g. the flow rate of gas through an absorption column countercurrent to the absorbent). Accordingly, the L/G ratio is a measure of the moles of amine circulated per mole of carbon dioxide in the inlet gas stream. Therefore, the L/G ratio determines the size of the liquid side equipment and pumping power that is required to obtain a particular level of carbon dioxide removal. The regeneration steam requirement relates to the amount of steam that is required to regenerate the amine absorbent. The larger the L/G ratio and the steam required per volume of $CO_2$ rich absorbent, the more energy must be provided to operate the process, to obtain a particular level of carbon dioxide removal. The amine loss rate relates to the extent to which the amine is degraded or lost by volatilization into the treated gas stream, and needs to be replaced. Accordingly, various different absorbents and combinations of absorbents have been proposed.

Primary and secondary amines, such as monoethanolamine (MEA) and diethanolamine (DEA) are very reactive with $CO_2$ and are therefore able to effect a high volume of carbon dioxide removal at a fast rate. Primary and secondary amines however have a limitation in that their maximum carbon dioxide loading capacity, based upon stoichiometry, is at best about 0.5 mole $CO_2$/mole of amine functionality. Further, amines, which form stable carbamates, e.g. strong primary amines, are difficult and energetically expensive to regenerate to low $CO_2$ content in the lean amine, so that the delta loading is often undesirably small per amine functionality. MEA for example has a delta loading of about 0.25 moles $CO_2$/mole amine. Tertiary amines, however, which are thermally and chemically more stable, such as methyldiethanolamine (MDEA), have an equilibrium carbon dioxide loading capacity that approaches 1.0 mole $CO_2$/mole amine. Furthermore stripping carbon dioxide from tertiary amines of moderate $pK_a$, e.g. $pK_a=8.0$-$9.5$, typically requires substantially less energy input than is required to strip carbon dioxide from primary and secondary amines, such as MEA or DEA.

Accordingly, both primary and secondary amines, as well as tertiary amines, have properties which make them desirable for use in acid gas capture. However, they each have disadvantages. Accordingly, it has been disclosed to use primary and secondary amines as activators for tertiary amines (see for example U.S. Pat. No. 5,700,437; U.S. Pat. No. 5,277,885 and WO2005/087349) in order to overcome their major disadvantage of slow reactivity with $CO_2$.

SUMMARY OF THE INVENTION

When a gas stream containing carbon dioxide is contacted with an aqueous amine solution, the acid gas reacts with the amine to form a soluble acid-base complex in the absorption solution or solvent. Carbon dioxide absorption can occur by two different reaction mechanisms. According to a first mechanism, the carbon dioxide hydrolyses to form carbonic acid (equation 1).

$$CO_2 + H_2O \Leftrightarrow H_2CO_3 \text{ (carbonic acid)} \qquad \text{Equation 1}$$

The carbonic acid in turn dissociates to hydrogen ions and bicarbonate (equation 2).

$$H_2CO_3 \Leftrightarrow H^+ + HCO_3^- \text{ (bicarbonate)} \qquad \text{Equation 2}$$

Bicarbonate can further ionize to another hydrogen ion and carbonate (equation 3).

$$HCO_3^- \Leftrightarrow H^+ + CO_3^- \text{ (carbonate)} \qquad \text{Equation 3}$$

The hydrogen ion then undergoes an acid-base reaction with the amine (equation 4) to yield the overall reaction shown in equation 5.

$$H^+ + R_1R_2R_3N \Leftrightarrow R_1R_2R_3NH^+ \qquad \text{Equation 4}$$

$$CO_2 + H_2O + R_1R_2R_3N \Leftrightarrow R_1R_2R_3NH^+HCO_3^- \qquad \text{Equation 5}$$

The hydration of carbon dioxide (equation 1) has a slow reaction rate. However, the remaining reactions are relatively quick and equation 4, which uses a tertiary amine, is essentially instantaneous. Accordingly, equation 1, the hydration of carbon dioxide, is the rate limiting reaction.

The second reaction mechanism is set out in equations 6-8 and requires the presence of a hydrogen atom bonded to the nitrogen atom of the amine. This second reaction mechanism results in the formation of an amine salt of a substituted carbamic acid (equation 8). This reaction sequence may only occur with primary and secondary amines. In effect, the carbon dioxide reacts with one primary or secondary amine molecule to form a carbamic acid intermediate (equation 6).

$$CO_2 + R_1R_2NH \Leftrightarrow R_1R_2N^+HCOO^- \qquad \text{Equation 6}$$

The carbamic acid intermediate then reacts with a second amine molecule to form an amine salt.

$$R_1R_2N^+HCOO^- + R_1R_2NH \Leftrightarrow R_1R_2NCOO^- + R_1R_2NH_2^+ \qquad \text{Equation 7}$$

$$CO_2 + 2R_1R_2NH \Leftrightarrow R_1R_2NH_2^+ R_1R_2NCOO^- \quad \text{Equation 8}$$

The rate of carbon dioxide absorption by the carbonate reaction is rapid, much faster than the carbon dioxide hydrolysis reaction.

The stoichiometry of the carbamate reaction indicates that the capacity of the amine solution for $CO_2$ is limited to 0.5 mole of $CO_2$ per mole of amine if the only reaction product is the amine carbamate. But, the carbamate can undergo partial hydrolysis to form bicarbonate, regenerating free amine (equation 9).

$$R_1R_2NH_2^+ R_1R_2NCOO^- + H_2O \Leftrightarrow 2R_1R_2NH + H^+ + HCO_3^- \quad \text{Equation 9}$$

The hydrogen ion produced in Equation 9 then reacts with a single amine molecule, i.e., at a reaction ratio of 1 mole of $CO_2$ per mole of amine.

Thus, rich amine $CO_2$ loadings exceeding 0.5 mol/mol, as experienced in some DEA applications, is possible through the hydrolysis of the carbamate intermediate to bicarbonate.

During the regeneration reaction, the absorption process, which is exothermic, must be reversed. If steam stripping is utilized, which is preferred, then a sufficient amount of steam must be produced to provide the required input of energy to essentially cause the overall reaction (equation 5 and/or 8) to operate in reverse. The $pK_a$, the negative logarithm of the ionization constant, is numerically equal to the solution pH at which the concentration of the base and conjugate acid are equal. In general, the stronger the base, the higher the heat of reaction with carbon dioxide. On the other hand, in order to absorb carbon dioxide, the base must be strong enough to buffer in the pH range which reduces the carbon dioxide vapour pressure over the absorbent solution to a value sufficiently low to meet the desired treated gas carbon dioxide concentration. In practice, this means working in the pH range of Equation 3, so that the equilibrium value of Equations 1 and 2 are shifted far enough to the right to minimize the carbon dioxide concentration.

As disclosed in U.S. Pat. No. 7,056,482, one of the most successful commercial processes for carbon dioxide removal from flue gas is the use of aqueous monoethanolamine (MEA). MEA has a pKa of 9.5 at 25° C. Accordingly, MEA is a relatively strong base. An MEA carbon dioxide capture process may consume in the regeneration step up to 30% of the steam generated in a boiler heated by the combustion of a fossil fuel, depending upon the scrubbing process configuration and energy integration.

Accordingly, as primary and secondary amines are less stable than tertiary amines, and as they require more steam for regeneration, the use of primary and secondary amines has focused on their use as activators to accelerate the capture of $CO_2$ with a tertiary amine. Thus, primary and secondary amines are used to overcome the rate-limiting step of the hydration of carbon dioxide. The reaction sequence, which operates when primary and secondary amines are used as activators for tertiary amines, can be represented by the sequential operation of Equations 6, 7, 9 and 4.

In accordance with the instant invention, it has surprisingly been determined that using selected amines, a $CO_2$ capture process may be conducted using substantially reduced energy input. In particular, the regeneration reaction may be conducted utilizing 1-2 pounds of steam per pound of $CO_2$ regenerated, preferably 1-1.5 pounds of steam per pound of $CO_2$ regenerated utilizing the amines according to the instant invention whereas, for example, a 30% MEA solution requires approximately two pounds of steam per pound of $CO_2$, when treating 12% vol. $CO_2$ feed gas at an absorber temperature of about 50° C. for 90% $CO_2$ capture. If feed gases of lower $CO_2$ concentration are treated or the gases are treated at a higher absorber temperature, then the steam consumption may rise to 2 pounds of steam per pound of $CO_2$, or even higher.

Accordingly, in accordance with one aspect of the instant invention, there is a process for recovering $CO_2$ from a feed gas stream comprising:
(a) treating the feed gas stream with a regenerated absorbent having a viscosity less than 15 centistokes that is selected from one the of the following groups:
   (i) at least one polyamine in the absence of an effective amount of tertiary amine functionalities having a $pK_a$ sufficient to neutralize carbamic acid, the polyamine having a pKa for each sorbing nitrogen of <10.0 at 25° C. and the feed gas stream has an $SO_2$ concentration less than 5 ppm vol; and,
   (ii) a polyamine in the absence of an effective amount of tertiary amine functionalities having a pKa sufficient to neutralize carbamic acid, the polyamine having at least one secondary amine functionality having a pKa for each sorbing nitrogen of <10.0 at 25° C.,
to obtain a spent absorbent and a $CO_2$ lean gas stream;
(b) conveying the $CO_2$ rich amine absorbent to a regeneration zone; and,
(c) regenerating the absorbent.

Accordingly, the applicant has developed a process that utilizes primary and secondary amines to reversibly capture $CO_2$. As these absorbents react rapidly with $CO_2$, the size of the absorber tower may be reduced. In the past, it has been acknowledged that primary amines degrade rapidly and require high regeneration energy and that secondary amines are generally used as activators to help tertiary amines absorb $CO_2$ faster. Diethanolamine (a secondary amine) has been widely used for $CO_2$ absorption but it has a relatively high regeneration energy requirement and can degrade rapidly, especially in contact with $CO_2$. Surprisingly, in contrast to prior art, we have found a process of eliminating or avoiding these known deficiencies of primary and secondary amines, The primary amines used in accordance with this invention are polyamines that reversibly react with $CO_2$, so that only the low energy part of the total theoretical absorption cycle need be utilized, while still having a high cyclic $CO_2$ capacity. These polyamines preferably have a low equivalent weight less then 100, preferably have a vapor pressure of the pure compound less than 20 mm Hg at 100° C., a degradation rate that is preferably less than 25%/yr and the primary amine functionalities have a $pK_a$ less than 10. More preferably, the primary amine functionalities have a $pK_a$ in the range, 10-8, and most preferably 9.5-8.5. These primary amines are preferably used in the absence of greater than 5 ppm $SO_2$, in the absence of electrophilic functional groups able to react with the amine and in the absence of tertiary amine functionalities with $pK_a$ greater than 7, and more preferably, greater than 6.

The secondary amines used in accordance with this invention reversibly react with $CO_2$ and preferably are polyamines, preferably have a low equivalent weight less than 150, preferably have a vapor pressure of the pure compound that is less than 20 mm Hg at 100° C. and preferably have a degradation rate<25%/yr. These secondary amines are preferably used in the absence of tertiary amine functionalities with $pK_a$ greater than 7 and, more preferably, greater than 6. More preferably, the secondary amine functionalities have a $pK_a$ in the range, 10-8, and most preferably 9.5-8.5.

Accordingly, in one embodiment the amine absorbent comprises at least one primary or secondary amine functionality, which is preferably an ethylene amine compound and, optionally, may comprise a plurality thereof. Such amines are used in the absence of an effective amount of tertiary amine functionalities having a pKa for each sorbing nitrogen preferably greater than 7 and, more preferably greater than 6 at 25° C. Accordingly, by limiting the amount of tertiary amine functionalities, and preferably by using an absorbent that does not contain any tertiary amine functionalities, the primary and secondary amine functionalities provide rapid $CO_2$ absorption in the absorber and also act as agents for conveying the carbon dioxide from an absorption zone to a regeneration zone. It will be appreciated that an amine absorbent may include tertiary amine functionalities if the tertiary amine functionalities have a pKa that is insufficient to neutralize carbamic acid, preferably less than 7 and, more preferably, less than 6.

By an "effective amount" is meant that the amount of tertiary amine functionalities that are present is not significant in providing a mass transfer vehicle from the absorption zone to the regeneration zone. For example, the absorbent preferably contains less than 5 mole %, more preferably less than 1 mole % and, most preferably, no tertiary amine functionalities having a pKa for each absorbing nitrogen of greater than 6.0 at 25° C.

By "sorbing nitrogen" is meant a nitrogen which will react with carbon dioxide or a hydrogen ion to form an amine salt. Accordingly, at least one of the nitrogens of a primary or secondary amine will react with carbon dioxide to form an amine salt. Optionally, each nitrogen atom may so react.

Preferably the polyethyleneamine comprises at least one of diethylenetriamine (DETA), triethylenetetramine (TETA) and tetraethylenepentamine (TEPA), or mixtures thereof and, more preferably, at least one of DETA and TETA or mixtures thereof.

In another embodiment, the regenerated absorbent has an absence of any tertiary amine functionality having a pKa for the sorbing nitrogen of greater than 7 and, preferably greater than 6 at 25° C.

In another embodiment, the absorbent has at least one amine that is a primary or a secondary amine and has at least one tertiary amine functionality wherein each tertiary amine functionality has a pKa less than 7 at 25° C. and, preferably less than 6 at 25° C.

In another embodiment, the absorbent comprises N-(2-hydroxyethyl)piperazine and preferably consists essentially of N-(2-hydroxyethyl)piperazine.

If the amine is selected from group (i) (preferably a polyethyleneamine), then the feed gas stream has a sulphur dioxide concentration of less than 5 ppm vol (namely parts per million by volume means the volume of pure $SO_2$ contained in the feed measured in parts per million, which for gases is the same as mole ppm) Accordingly, the feed gas stream may be subjected to a pre-treatment stage wherein the feed gas stream is contacted with an $SO_2$ absorbent to reduce the sulphur dioxide concentration therein to a level, e.g., less than 5 ppm vol.

Alternately, or in addition, if the absorbent is selected from group (i), then the regenerated absorbent preferably comprises an aqueous solution having a concentration of less than 1 mole percent, preferably less than 0.1 mole percent and, most preferably less than 0.01 mole percent of compounds having electrophilic functional groups. Electrophilic functional groups comprise alkylhydroxy groups. Examples of electrophilic compounds include alkanolamines, sulfur dioxide, sulfites, bisulfite, carbonyl compounds such as ketones, aldehydes and carboxylic acids or salts thereof.

Alternately, if the amine is selected from group (ii), it may comprise or consist essentially of N-(2-hydroxyethyl)piperazine (HEP). HEP has both a secondary amine functionality with a pKa of <10.0 at 25° C., (i.e., a $pK_a$ of 9.0) and a tertiary amine functionality having a pKa that is insufficient to neutralize carbamic acid, (i.e. a $pK_a$ of 4.3). Accordingly, a compound used as an absorbent may have (1) primary and/or secondary amine functionalities and (2) tertiary amine functionalities, provided that the tertiary amine functionalities have a pKa less than 7 and preferably less than 6 at 25° C.

The feed gas stream preferably comprises greater than 1% by volume of carbon dioxide and, more preferably greater than 4% carbon dioxide by volume. Preferably, the process is conducted such that the carbon dioxide lean gas stream (i.e. the treated gas stream) contains less than 50% of the carbon dioxide in the feed gas stream and, more preferably, less than 10% of the carbon dioxide in the feed gas stream and, most preferably, less than 1% of the carbon dioxide in the feed gas stream. Accordingly, the process may result in the capture of more than 50%, preferably more than 90% and, most preferably more than 99% of the carbon dioxide in the feed gas stream. Accordingly, even if the feed gas stream comprises 4% or more of carbon dioxide, the treated feed gas stream may contain less than 1 volume percent carbon dioxide.

The absorption process may be operated such that the Delta loading (i.e., the difference in $CO_2$ loading per mole of absorbent between the regenerated absorbent, i.e. post regeneration, and the spent absorbent, i.e., post absorption) is of 0.4-1 mole $CO_2$/mole of amine, preferably as high as possible, when treating a feed gas comprising greater than 4 % vol. of $CO_2$.

As the viscosity of the absorbent increases, the thickness of the liquid side boundary layer increases due to a lower rate of diffusion of reactants in the more viscous liquid. This results in a reduction in the overall mass transfer coefficient of components from the gas into the absorbent. Accordingly, the lean regenerated absorbent has a viscosity less than 15 cst at 50° C., preferably less than 10 cst and, more preferably less than 7 cst.

Typically, the polyamines utilized in accordance with the instant invention are provided in an aqueous solution. Accordingly, the concentration of the amine in water may be adjusted such that the regenerated absorbent has the required viscosity.

Accordingly, one advantage of the instant invention is that the steam requirement, and therefore the overall energy input, which is required to operate the process is substantially reduced compared to processes utilizing MEA and may result in a reduction in steam utilization of about 35% or more compared to commercial MEA carbon dioxide capture operations.

In the operation of a $CO_2$ capture process, it is desirable that the absorbent amine have a low volatility, in order to minimize loss of the chemical into the treated gas as a pollutant or into the $CO_2$ byproduct reducing its purity. Accordingly, amine solvents with a vapor pressure less than 20 mm Hg, measured for the pure compound at 100° C. are preferred.

BRIEF DESCRIPTION OF THE DRAWINGS

These and other advantages of the instant invention will be more fully and completely understood in accordance with following description of a preferred embodiment of the invention in which.

DESCRIPTION OF THE PREFERRED EMBODIMENT

Figure 1:
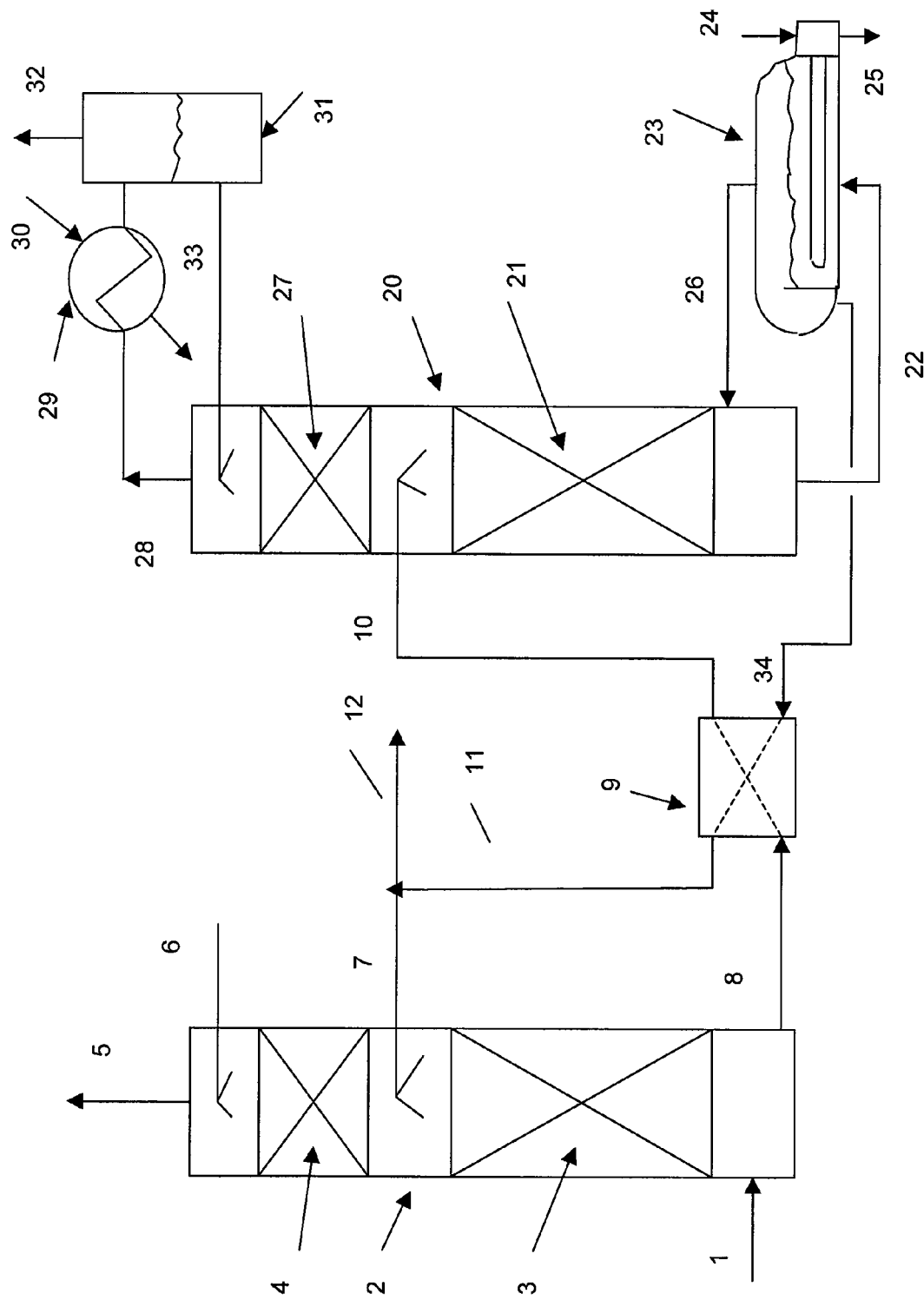
FIG. 1 is a schematic diagram of a process to capture $CO_2$ from a feed gas stream according to the first embodiment of the instant invention.

The exemplary process flow diagram for one embodiment of a process to capture $CO_2$ according to the present invention is shown in FIG. 1. Referring to FIG. 1, a carbon dioxide containing feed gas stream 1 is treated to obtain a $CO_2$ rich stream 8. The feed gas stream 1 may be any stream which contains $CO_2$ at levels which require treatment for $CO_2$ removal before the gas is released to the atmosphere and is preferably a waste gas stream, such as flue gas streams, kiln gas, reverberatory furnace gas, fluidized catalytic cracker (FCC) regenerator off gas and the like.

$CO_2$ rich stream 8 is prepared by contacting feed gas stream 1 with any of the $CO_2$ absorbents taught herein. As shown in FIG. 1, feed gas stream 1 flows into a gas-liquid contact apparatus 2, where intimate contact between feed gas stream 1 and lean absorbent stream 7 occurs. The apparatus 2 may be any gas-liquid contactor or absorption tower known in the art such as a spray or packed tower. FIG. 1 illustrates a packed tower, wherein gas liquid contact is promoted by suitable random or structured packing 3 in the column. $CO_2$ is absorbed into the lean absorbent 7, producing rich $CO_2$-containing absorbent, which exits from the apparatus 2 as $CO_2$ rich stream 8.

The feed gas stream 1, which is depleted in $CO_2$, is optionally washed with water (stream 6), such as in another packed section 4, to remove absorbent that may have splashed or volatilized into the treated gas stream traveling upwardly through apparatus 2. The water of stream 6 may be a part of the condensate stream 33 or it may be makeup water introduced to the process. The water balance in the overall process may be maintained by adding water, for example via stream 6, or withdrawing water from the process, such as by directing a part of stream 33 to waste. The gas then leaves the apparatus 2 as treated feed gas stream 5 for either release into the atmosphere or for further treatment or use.

In order to conserve energy, heated streams may be used to preheat cooler streams that are subsequently fed to the process equipment. For example, as shown in FIG. 1, $CO_2$ rich stream 8 flows through a cross heat exchanger 9, where it is indirectly heated by stream 34 (a heated lean amine stream which is recycled to absorb $CO_2$), and is then introduced into regeneration tower 20 as stream 10.

$CO_2$ rich stream 8 is then treated at a temperature higher than the absorption temperature in apparatus 2 to regenerate the absorbent. At this stage, the $CO_2$ in the downwardly moving absorbent is removed by upwardly moving stripping gas or steam to produce a $CO_2$ rich product stream 28 and a regenerated absorbent (lean absorbent stream 22). Inert gas stripping may also be practiced for stripping the $CO_2$ from the $CO_2$ rich stream in tower 20. The absorbent may be heated by any means known in the art. Preferably, the absorbent is reheated by means of steam, such as in a steam-stripping tower 20, but other sources of heat such as hot gas, heat transfer liquids and direct firing may be used.

Tower 20 can be of either a packed or trayed design. A packed tower with a packing section 21 is shown in FIG. 1 below the rich solvent feed level (stream 10). The rich solvent is stripped of $CO_2$ as it flows downward in the tower and into a reboiler 23. The reboiler is heated by any means known in the art. Preferably reboiler 23 is indirectly heated by stream 24 (which may be steam and may be obtained from any source) through, e.g., a heat transfer tube bundle, producing a steam condensate stream 25 which may be recycled to produce additional steam or used elsewhere in the plant. The boiling of the aqueous solvent (absorbent) in reboiler 23 produces a flow of steam 26 into the regeneration tower 20. The steam ascends through the column, heating the downward flowing solvent and carrying upwards the $CO_2$ evolved from the solvent. The steam and $CO_2$ mixture exits the tower as stream 28.

Preferably, stream 28 is treated to remove excess water vapor contained therein. Preferably, the water vapor is removed by condensation (e.g. by means of cooling with a cooling liquid). As shown in FIG. 1, a flow of cooling water 30 into overhead condenser 29 causes condensation of most of the steam in stream 28, producing a 2-phase mixture, which flows into the condensate accumulator 31. The gaseous phase, which is water saturated $CO_2$, leaves as product stream 32 for use. The condensed water is returned to the tower 20 as stream 33, where it flows downward through optional packed section 27. The cool condensate of stream 33 serves to wash volatilized absorbent from the vapors before they leave the tower 20 as stream 28. This helps to reduce loss of absorbent chemical with the gaseous $CO_2$ stream 32. It will be appreciated that additional treatment steps may be used to further limit the loss of absorbent from the process.

Preferably, hot lean amine stream 34 is used to preheat $CO_2$ rich stream 8. However, it will be appreciated that stream 8 may be heated by other means (e.g. by passing it through reboiler 23 or heating stream 8 upon entry to tower 20 or any combination thereof). As shown in FIG. 1, lean amine leaves regeneration tower 20 as stream 22 and enters the reboiler 23. The solvent then leaves the reboiler 23 by overflowing a weir as heated lean absorbent stream 34, which passes through the cross heat exchanger 9 to preheat stream 8. The lean solvent leaves heat exchanger 9 as a cooler lean absorbent stream 11, which may optionally be cooled further by a lean solvent trim cooler (not shown).

A slipstream 12 of flow from stream 11 may be treated to remove heat stable salts (HSS) and returned to, e.g., stream 11. HSS removal may be effected by any method known in the art, such as electrodialysis or ion exchange. Stream 7 enters the absorption tower 2 for capturing $CO_2$ from the feed stream 1.

The process may be operated with any convenient pressure in the absorber 2. If the feed gas stream 1 is flue gas from a boiler, which usually is operated near atmospheric pressure, then tower 2 may be operated at about atmospheric pressure or a bit below the pressure of feed stream 1 so as to favor the flow of feed gas 1 into tower 2. The regeneration tower 20 is often operated at a pressure slightly over atmospheric, generally not exceeding 3 bars absolute. The byproduct $CO_2$ will be at a higher pressure, helping it to flow to a downstream unit without the aid of a fan or compressor.

In accordance with another embodiment of the instant invention, such as if the absorbent is a primary ethylene amine, the process is used to remove $SO_2$ from the feed gas prior to the $CO_2$ removal step. Any process known in the art may be used.

As exemplified in FIG. 2, which is a simplified drawing of the equipment, such a process may operate as follows. A feed gas stream 50, containing both $SO_2$ and $CO_2$, enters an optional prescrubber 51 where it is saturated with a spray of water supplied by pump 52 and is thereby cooled to, e.g., its adiabatic saturation temperature. The spray of water also removes at least some of the particulate matter and strong acids such as hydrochloric acid and sulfuric acid from the feed gas. The pretreated gas flows from prescrubber 51 to the $SO_2$ removal section of tower 54 through, e.g., a chimney tray 53, which serves to prevent the $SO_2$ rich stream 60 from entering the prescrubber 51. Optionally, if the gas is not too hot and/or dirty, the cooling and water saturation can also be performed simultaneously with the $SO_2$ removal in the packed tower section 55 if desired.

The gas, which has optionally been pretreated, flows through, e.g., chimney tray 53 into a $SO_2$ removal circuit of a tower having a packed tower section 55 where the gas flows countercurrently to lean diamine absorbent stream 76 wherein the diamine absorbent is in so-called "half salt" form, as is described in U.S. Pat. No. 5,019,361. Preferably the majority of the $SO_2$ in the feed gas is removed and leaves the tower in the $SO_2$ rich solvent stream 60. The $SO_2$ rich stream 60 is treated to obtain a first regenerated absorbent stream 61, which is used in the $SO_2$ scrubbing loop (i.e. packed tower section 55). $SO_2$ rich stream 60 may be regenerated by any means known in the art such as steam stripping. As shown in FIG. 2, regeneration tower 68 functions like the regeneration tower 20 in FIG. 1 and produces a stream of lean half salt amine solution 61 and a byproduct $SO_2$ stream 64. The peripheral equipment, reboiler, overhead condenser and reflux drum are not shown in FIG. 2 but are preferably arranged as shown in FIG. 1. Any $SO_2$ absorbent known in the art may be used, even non-regenerable absorbents such as caustic, in which cases the regeneration equipment 68 is not required.

Preferably, the first regenerated absorbent stream 61 is treated to remove heat stable salts. Preferably only a portion of first regenerated absorbent stream 61 is so treated with the remainder being returned to packed tower section 55 to absorb more $SO_2$.

Figure 2:
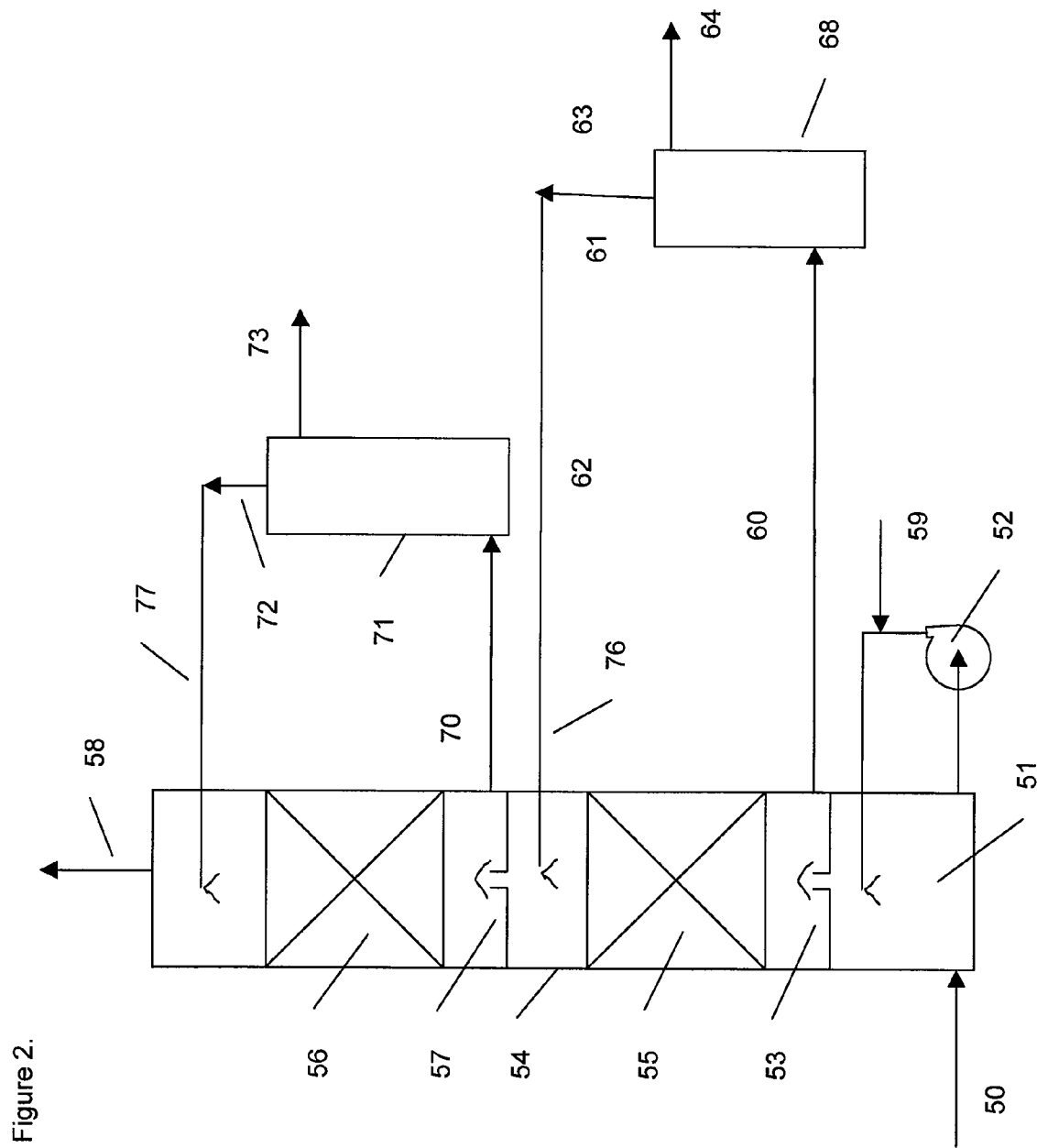
FIG. 2 is a schematic diagram of a process to capture $CO_2$ and $SO_2$ (plus optionally $NO_x$) with one absorption agent in each successive step, according to a second embodiment of the instant invention; and, FIG. 3 is a graph of percent of $CO_2$ removal for various viscosities of the absorbent.

As shown in FIG. 2, the two absorption loops are conducted sequentially on feed gas stream 50. The treatment of the gas for $SO_2$ removal in packed tower section 55 results in the production of a $SO_2$ lean stream. This $SO_2$ lean stream is then treated in a $CO_2$ scrubbing loop with a second absorbent stream 77 to obtain a $CO_2$ rich stream 70. The $CO_2$ rich stream 70 is subsequently treated to obtain a second regenerated absorbent stream 72, which is used in the $CO_2$ scrubbing loop. The $CO_2$ scrubbing loop may be operated in a different tower than the $SO_2$ scrubbing loop. In accordance with the preferred embodiment of the invention exemplified in FIG. 2, the $CO_2$ scrubbing loop is operated in the same tower as the $SO_2$ scrubbing loop. According to this embodiment, the gas treated for $SO_2$ removal in the packed tower section 55 then flows through, e.g., chimney tray 57 and is washed countercurrently with $CO_2$ absorbent stream 77 in packed section 56. The $CO_2$ rich absorbent stream 70 flows to a regenerator, e.g., a regeneration tower 71, which is preferably of a design equivalent to the regeneration tower 20 shown in FIG. 1. The $CO_2$ product stream that exits tower 71 may be treated to remove excess absorbent or water, such as by means of a reflux accumulator (not shown), to produce a $CO_2$ product stream 73 and a $CO_2$ lean absorbent stream 72 which flows into the absorption tower as stream 77.

Preferably, the second regenerated absorbent stream 72 is treated to remove heat stable salts. Preferably only a portion of second regenerated absorbent stream 72 is so treated with the remainder being returned to packed tower section 56 to absorb more $CO_2$.

The treated feed gas stream 50, now reduced in $SO_2$ and $CO_2$ content, flows out of the absorber tower 54 as stream 58 for further treatment, use or exhaustion into the atmosphere.

EXAMPLE 1

In order to determine the maximum loading capacity of various amine absorbents, aqueous solutions of the amines were sparged at 50° C. with $CO_2$ containing gas using a sintered glass bubbler, until the weight of the sample was constant. The results for the loading capacity in terms of moles $CO_2$ per mole of amine that are set out in Table 1 were obtained.

TABLE 1

| amine | pKa | Concentration % wt. | $CO_2$ % vol. | Static Loading 50° C. Moles $CO_2$/ mole amine |
|---|---|---|---|---|
| Piperazine MW 86 | 9.5 | 5.6 | 20 | 100 | 0.91 |
| | | 50 | 20 | 0.75 |
| | | 20 | 12 | 0.66 |
| Monoethanolamine MW 61 | 9.5 | 25 | 12 | 0.46 |
| Triethylethylenediamine MW 144 | 9.9 | 6.8 | 20 | 12 | 0.7 |
| N,N'-Bis(2-hydroxyethyl)ethylenediamine MW 146 | 9.2 | 6.3 | 20 | 12 | 0.6 |
| N-(2-hydroxyethyl)piperazine HEP MW 130 | 8.9 | 4.3 | 40 | 12 | 0.55 |
| Di-isopropanolamine | 8.7 | | 20 | 12 | 0.38 |
| Triethylenetetramine TETA MW 146 | 9.9 9.2 3.3 | 6.7 | 30 | 12 | 1.84 |
| Trimethylenedipiperidine TMP MW 210 | 10.9 | 10.9 | 10 | foaming | foaming |
| 1,3-bis(aminomethyl)cyclohexane MW 142 | 10.2 | 10.2 | 30 | 12 | 0.85 |
| N,N'-bis(tert-butyl) ethylenediamine MW 172 | 10.4 | 7.5 | Not soluble | | |
| Diethylenetriamine | 9.9 | 9.1 | 30 | 12 | 1.01 |

TABLE 1-continued

| amine | pKa | Concentration % wt. | $CO_2$ % vol. | Static Loading 50° C. Moles $CO_2$/ mole amine |
|---|---|---|---|---|
| (DETA) MW 103 | 4.3 | | | |
| Tetraethylenepentamine TEPA MW 189 | 9.9, 9.1, 7.9, 4.3, 2.7 | 30 | 12 | 2.45 |

Based upon the results in Table 1, at equilibrium conditions, high loading was obtained for several of the absorbents. It was noted that some of the absorbents attained full loading faster than others, indicating that the kinetics of absorption varied.

EXAMPLE 2

A bench scale pilot unit was operated to measure the dynamic performance of various amine solutions in water. A feed gas supply at a rate of 2 liters/minute from gas cylinders of air, nitrogen and carbon dioxide was regulated to produce a gas mix comprising 12% carbon dioxide. The feed gas flowed into a 3-neck flask with a one-inch diameter glass absorber column mounted in the central neck. The flask contained a magnetic stirring bar and was immersed in an oil bath on a stirring hotplate. The oil bath was maintained at 50° C. The 1 inch outside diameter glass absorber column was filled with 0.16 inch 316 SS Porapak™ saddle packing to a height of 12 inches. The top of the column had a scrubbed gas outlet and a lean solvent inlet. Rich solvent from the three-neck flask was pumped to the top of the regeneration column with a variable speed pump. The regeneration column comprising five sieve trays had a rich absorbent inlet near the top and a reflux condenser with an off gas outlet thereabove.

The regeneration column fitted into the central neck of a three-neck flask that was immersed in an oil bath sitting on a stirring hotplate so as to maintain the oil bath at 140-150° C. The flask contained a magnetic stirring bar. The regenerated absorbent (lean solvent) was pumped from the flask to the absorber column through a cooler by a variable rate pump.

The total volume of absorbent in the apparatus was 600 ml. The absorbent flow rate used was 5 ml/minute. The experiment was repeated with a series of different absorbents. The delta loading (mole $CO_2$/mole absorbent) of the absorbent was calculated from the rate of moles of $CO_2$ captured divided by the mole flow rate of amine. The $CO_2$ concentrations in the feed and treated gases were measured by a Horiba PG-250 analyzer. The liquid-to-gas ratio in these experiments was 17 gallons/1000 cubic feet of feed gas. The results are set out in Table 2. The data illustrates that primary and secondary amines absorb $CO_2$ rapidly, while a tertiary amine, even with mass transfer additive (or "activator") added reacts more slowly.

TABLE 2

| Amine | Amine Functionality | Weight, % | Molarity, $Mol \cdot L^{-1}$ | $CO_2$ Delta Loading, mol/mol | $CO_2$ removal, % | Viscosity @ 50° C., Cst. |
|---|---|---|---|---|---|---|
| DETA | 2 primary 1 secondary | 30 40 | 2.9 3.88 | 0.6 0.5 | 90 87 | 1.98 3.27 |
| TETA | 2 primary 2 secondary | 23.2 40.7 47 51.8 62.7 | 1.59 2.7 3.22 3.54 4.29 | 1.10 0.65 0.35 0.23 0.15 | 80 79 50 25 23 | 1.9 6.88 10.7 17 23.32 |
| TEPA | 2 primary 3 secondary | 20.0 52.5 | 1.06 2.9 | 1.6 0.07 | 75 9 | 2.21 41.22 |
| MEA Piperazine | 1 primary 2 secondary | 21.4 | 3.5 | 0.32 | 38 crystals | 1.11 |
| HEP | 1 secondary 1 tertiary | 38 50 | 2.9 3.85 | 0.55 0.40 | 80 68 | 3.07 6.66 |
| DEA | 1 secondary | 30.5 | 2.9 | 0.43 | 55 | 1.98 |
| 34% MDEA + 6% piperazine | | 40 | 3.6 | 0.22 | 47 | 3.68 |

EXAMPLE 3

The effect of sulfur dioxide derived species on the stability of primary amine solutions was tested by the addition of 1% wt. of $Na_2SO_3$ and 0.2% of $Na_2S_2O_3^=$ to a DETA primary amine $CO_2$ removal solution that without the additives showed stable $CO_2$ removal performance. With the additives, $CO_2$ removal under test conditions similar to that used in Example 2 showed a decrease in removal from 74% at the start to 53% after 47 hours of operation.

EXAMPLE 4

The effect of a change of viscosity on carbon dioxide removal was determined utilizing a feed gas comprising 12% carbon dioxide. The absorbent comprised TETA in water having a molarity varying from 1.08 to 3.0. The test was conducted at 50° C. using laboratory pilot plant described in Example 2. Viscosity of the solutions was determined using Ubbelohde™ viscometer tubes. The results are set out graphically in FIG. 3. Without being limited by theory, it is assumed that the drop in $CO_2$ absorption efficiency as the solvent viscosity increases beyond a certain value is due to the diffusion rate in the increasingly thick liquid side boundary layer becoming limiting.

The invention claimed is:

1. A process for recovering $CO_2$ from a feed gas stream comprising:
   a. treating the feed gas stream with a regenerated absorbent having a viscosity less than 15 centistokes that is selected from one the of the following groups:
      i. at least one polyamine in the absence of an effective amount of tertiary amine functionalities having a pKa sufficient to neutralize carbamic acid, the polyamine having at least one primary amine functionality having a pKa of <10.0 at 25° C. wherein and the feed gas stream has an $SO_2$ concentration less than 5 ppm vol.; and,
      ii. a polyamine in the absence of an effective amount of tertiary amine functionalities having a pKa sufficient to neutralize carbamic acid, the polyamine having at least one secondary amine functionality having a pKa for each sorbing nitrogen of <10.0 at 25° C.
   to obtain a spent absorbent and a $CO_2$ lean gas stream;
   b. conveying the $CO_2$ rich amine absorbent to a regeneration zone; and,
   c. regenerating the absorbent by steam stripping, wherein the steam stripping is conducted using from 1.0 to 2.0 pounds of steam per pound of $CO_2$ absorbed.

2. The process of claim 1 wherein the absorbent is selected from group (i) and the feed gas stream is treated with a $SO_2$ absorbent prior to being treated with the regenerated absorbent.

3. The process of claim 1 wherein the absorbent is selected from group (i) and the regenerated absorbent comprises an aqueous solution having a concentration of less than 0.001 molar of compounds having electrophilic functional groups.

4. The process of claim 3 wherein the electrophilic functionalities comprise alkylhydroxy groups.

5. The process of claim 3 wherein the compounds having electrophilic functional groups comprise alkanolamines, sulfur dioxide sulfite, bisulfite and carbonyl compounds.

6. The process of claim 1 wherein the regenerated and spent absorbents have a difference in $CO_2$ loading per mole of absorbent of 0.4 to 1.0 mole $CO_2$/mole of amine, when treating a feed gas comprising greater than 4 % vol. of $CO_2$.

7. The process of claim 1 wherein the $CO_2$ lean gas stream contains less than 1 % vol. $CO_2$.

8. The process of claim 1 wherein the $CO_2$ lean gas stream contains less than 10% of the $CO_2$ in the feed gas stream.

9. The process of claim 1 wherein the $CO_2$ lean gas stream contains less than 50% of the $CO_2$ in the feed gas stream.

10. The process of claim 1 wherein the amine reacts with the $CO_2$ to form an amine salt.

11. The process of claim 1 wherein the absorbent is selected from group (i) and the process further comprises selecting at least one of diethylenetriamine (DETA), triethylenetetramine (TETA) and tetraethylenepentamine (TEPA) or mixtures thereof as the absorbent.

12. The process of claim 1 wherein the regenerated absorbent has an absence of any tertiary amine functionality having a pKa for the sorbing nitrogen of >6.0 at 25° C.

13. The process of claim 1 wherein the absorbent has an absence of any tertiary amine functionality that has a pKa greater than 7 at 25° C.

14. The process of claim 1 wherein the absorbent has at least one amine that is a primary or a secondary amine and has at least one tertiary amine functionality wherein each tertiary amine functionality has a pKa less than 7 at 25° C.

15. The process of claim 14 wherein each tertiary amine functionality has a pKa less than 6 at 25° C.

16. The process of claim 1 wherein the absorbent comprises N-(2-hydroxyethyl)piperazine.

17. The process of claim 1 wherein the absorbent consists essentially of N-(2-hydroxyethyl)piperazine.

18. A process for recovering $CO_2$ from a feed gas stream comprising:
   a. treating the feed gas stream with a regenerated absorbent having a viscosity less than 15 centistokes that is selected from one the of the following groups:
      i. at least one polyamine in the absence of an effective amount of tertiary amine functionalities having a pKa sufficient to neutralize carbamic acid, the polyamine having at least one primary amine functionality having a pKa of <10.0 at 25° C. wherein and the feed gas stream has an $SO_2$ concentration less than 5 ppm vol.; and,
      ii. a polyamine in the absence of an effective amount of tertiary amine functionalities having a pKa sufficient to neutralize carbamic acid, the polyamine having at least one secondary amine functionality having a pKa for each sorbing nitrogen of <10.0 at 25° C.
   to obtain a spent absorbent and a $CO_2$ lean gas stream;
   b. conveying the $CO_2$ rich amine absorbent to a regeneration zone; and,
   c. regenerating the absorbent;
   wherein the regenerated and spent absorbents have a difference in $CO_2$ loading per mole of absorbent of 0.4 to 1.0 mole $CO_2$/mole of amine, when treating a feed gas comprising greater than 4 % vol. of $CO_2$.

* * * * *